United States Patent
Yang et al.

(10) Patent No.: US 10,197,238 B2
(45) Date of Patent: Feb. 5, 2019

(54) LIGHTING APPARATUS

(71) Applicant: LG INNOTEK CO., LTD., Seoul (KR)

(72) Inventors: Hyun Duck Yang, Seoul (KR); Jae Hyuk Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 189 days.

(21) Appl. No.: 15/116,953

(22) PCT Filed: Feb. 5, 2015

(86) PCT No.: PCT/KR2015/001178
§ 371 (c)(1),
(2) Date: Aug. 5, 2016

(87) PCT Pub. No.: WO2015/119435
PCT Pub. Date: Aug. 13, 2015

(65) Prior Publication Data
US 2017/0176664 A1 Jun. 22, 2017

(30) Foreign Application Priority Data
Feb. 5, 2014 (KR) .................. 10-2014-0013287

(51) Int. Cl.
*G02B 6/00* (2006.01)
*F21S 43/237* (2018.01)
(Continued)

(52) U.S. Cl.
CPC ............. *F21S 43/237* (2018.01); *F21S 43/14* (2018.01); *F21S 43/19* (2018.01); *F21S 43/195* (2018.01);
(Continued)

(58) Field of Classification Search
CPC .. G02B 6/0038; G02B 6/0055; G02B 6/0068; G02B 6/0083; F21S 48/2281
See application file for complete search history.

(56) References Cited

U.S. PATENT DOCUMENTS

| | | | |
|---|---|---|---|
| 4,806,903 A * | 2/1989 | Rust ....................... | B60Q 1/302 340/464 |
| 8,414,162 B2 * | 4/2013 | Pijlman ................ | G02B 6/0021 362/339 |

(Continued)

FOREIGN PATENT DOCUMENTS

| | | |
|---|---|---|
| CN | 102062334 A | 5/2011 |
| EP | 2 690 356 A2 | 1/2014 |

(Continued)

OTHER PUBLICATIONS

Supplementary European Search Report dated Oct. 20, 2017 in European Application No. 15746078.3.

(Continued)

*Primary Examiner* — Julie Bannan
(74) *Attorney, Agent, or Firm* — Saliwanchik, Lloyd & Eisenschenk (57) ABSTRACT

The present invention relates to a lighting apparatus using linear light having a three dimensional effect, the lighting apparatus comprising: a light guide unit which has a first side and a second side opposite to the first side, and has a predetermined thickness between the first side and the second side; a three dimensional effect formation unit which is disposed inside or on the surface of the light guide unit and has a pattern; a first light source, disposed in a first area of the pattern, for irradiating an incident light of a first color to the pattern; and a second light source, disposed in a second area of the pattern, for irradiating, to the pattern, an incident light of a second color different from the first color, wherein the pattern is sequentially arranged on a pattern arrangement surface parallel to the second side, has an inclined surface forming an inclination angle with respect to the pattern arrangement surface, and guides an incident light in a first side direction that the first side faces or in a second side (Continued)

direction that the second side faces by refraction or reflection on the inclined surface, to thereby generate a linear light of a first path.

20 Claims, 9 Drawing Sheets

(51) Int. Cl.
| | | |
|---|---|---|
| *F21S 43/249* | (2018.01) | |
| *F21S 43/245* | (2018.01) | |
| *F21S 43/243* | (2018.01) | |
| *F21S 43/239* | (2018.01) | |
| *F21S 43/14* | (2018.01) | |
| *F21S 43/19* | (2018.01) | |
| *G09F 13/00* | (2006.01) | |
| *F21V 8/00* | (2006.01) | |
| *F21S 10/00* | (2006.01) | |

(52) U.S. Cl.
CPC .......... *F21S 43/239* (2018.01); *F21S 43/243* (2018.01); *F21S 43/245* (2018.01); *F21S 43/249* (2018.01); *G02B 6/0021* (2013.01); *G02B 6/0038* (2013.01); *G02B 6/0055* (2013.01); *G02B 6/0068* (2013.01); *G02B 6/0083* (2013.01); *G09F 13/00* (2013.01); *F21S 10/00* (2013.01)

(56) References Cited

U.S. PATENT DOCUMENTS

| | | | |
|---|---|---|---|
| 2006/0002146 A1 | 1/2006 | Baba | |
| 2007/0097709 A1* | 5/2007 | Hsieh | G02B 6/0038 362/620 |
| 2007/0127264 A1 | 6/2007 | Sugiura et al. | |
| 2008/0055933 A1* | 3/2008 | Vissenberg | G02B 6/0038 362/620 |
| 2010/0265694 A1* | 10/2010 | Kim | G02B 6/0021 362/97.1 |
| 2011/0069496 A1* | 3/2011 | Ing | B29D 11/00798 362/311.02 |
| 2014/0003076 A1* | 1/2014 | Suganumata | B60Q 1/30 362/511 |
| 2014/0043819 A1* | 2/2014 | Yang | G02B 6/0088 362/268 |

FOREIGN PATENT DOCUMENTS

| | | |
|---|---|---|
| JP | 11-353920 A | 12/1999 |
| JP | 2003050555 A | 2/2003 |
| KR | 1020090095366 A | 9/2009 |
| KR | 1020100105010 A | 9/2010 |
| KR | 10-2011-0076247 A | 7/2011 |
| KR | 1020110076247 A | 7/2011 |
| KR | 10-2012-0009209 A | 2/2012 |
| KR | 10-2012-0097316 A | 9/2012 |
| KR | 1020120097316 A | 9/2012 |
| WO | WO-2008/044175 A2 | 4/2008 |

OTHER PUBLICATIONS

International Search Report in International Application No. PCT/KR2015/001178, filed Feb. 5, 2015.
Office Action dated Aug. 31, 2018 in Chinese Application No. 201580007558.5, with its English Translation.

* cited by examiner

LIGHTING APPARATUS

CROSS-REFERENCE TO RELATED APPLICATION

This application is the U.S. national stage application of International Patent Application No. PCT/KR2015/001178, filed Feb. 5, 2015, which claims priority to Korean Application No. 10-2014-0013287, filed Feb. 5, 2014, the disclosures of each of which are incorporated herein by reference in their entirety.

TECHNICAL FIELD

The present invention relates to a lighting apparatus, and more particularly, to a lighting apparatus using linear light having a three-dimensional effect.

BACKGROUND ART

A light emitted diode (LED) refers to a device which converts an electric signal to infrared rays or light using properties of a compound semiconductor, and is advantageous in terms of having a long life span compared to conventional other light sources and causing little environmental pollution because it does not use harmful substance unlike a fluorescent light or the like in which mercury or the like is used. In addition, an LED is advantageous in that visibility is excellent due to a high color temperature and power consumption is low when compared to other light sources.

Thanks to the advancement and supply of LED technology, a trend of a lighting apparatus is advancing from using conventional light sources such as a fluorescent light or the like to using an LED light source. For example, as disclosed in Korean Patent Laid-Open Publication No. 10-2012-0009209, a lighting apparatus which performs a surface light-emitting function using an LED light source and a light guide plate has been proposed.

In addition, in some conventional technologies, a lighting apparatus in which surface light-emitting performance is enhanced by adding an optical sheet such as a diffusion sheet, a prism sheet, a protective sheet, or the like to the light guide plate has been suggested.

However, a conventional lighting apparatus using an LED light source is limited in thinning a thickness of an entire product due to a thickness of the light guide plate itself, is disadvantageous due to being difficult to apply to a housing or an application in which a curve is formed because a material of the light guide plate is not flexible, and is disadvantageous in designing a product and modifying a design due to the light guide plate. Accordingly, a solution which can be easily applied to diverse applications such as indoor and outdoor lighting, vehicle lighting, or the like, and can effectively implement light images as desired is required.

DISCLOSURE

Technical Problem

The present invention is directed to providing a lighting apparatus capable of implementing various light images having a three-dimensional effect using different kinds of light sources in combination.

The present invention is also directed to providing a lighting apparatus for a vehicle application capable of reducing a size of a light source and obtaining benefits from a design perspective.

Technical Solution

One aspect of the present invention includes a light guide portion having a first surface and a second surface opposite to the first surface, and having a predetermined thickness between the first surface and the second surface, a three-dimensional effect formation portion disposed in the light guide portion or on a surface thereof and including a pattern, a first light source disposed in a first area of the pattern and irradiating incident light of a first color toward the pattern, and a second light source disposed in a second area of the pattern and irradiating incident light of a second color different from the first color toward the pattern, wherein the pattern includes inclined surfaces sequentially arranged on a pattern arrangement surface parallel with the second surface and having an inclination angle with respect to the pattern arrangement surface, and generates linear light of a first path by guiding the incident light in a first surface direction which faces the first surface or in a second surface direction which faces the second surface by refraction and reflection at the inclined surface.

Advantageous Effects

According to the present invention, a lighting apparatus capable of implementing various light images having a three-dimensional effect using different kinds of light sources in combination can be provided.

According to the present invention, a lighting apparatus for a vehicle application capable of reducing a size of a light source and obtaining benefits in design can be provided. In addition, a lighting apparatus in which a material is reduced and two or more functions are implemented in a single module can be provided.

DETAILED DESCRIPTION

Exemplary embodiments according to the present invention will now be described more fully hereinafter with reference to the accompanying drawings so that those having ordinary skill in the art can easily embody them. However, since embodiments of the invention described in this specification and constitutions illustrated in the drawings are merely preferred embodiments, it should be understood that there may be various equivalents or modifications that may substitute these embodiments at the time of present application. In addition, in the detailed description of operating principles of the preferred embodiments of the present invention, detailed descriptions of well-known functions or configurations will be omitted where they may unnecessarily obscure the subject matters of the invention. In addition, since terms described below are defined considering functions of the present invention, definitions of these terms may be made on the basis of the content throughout the specification. Throughout the drawings, elements performing similar functions and actions are designated by the same reference numerals.

Figure 1:
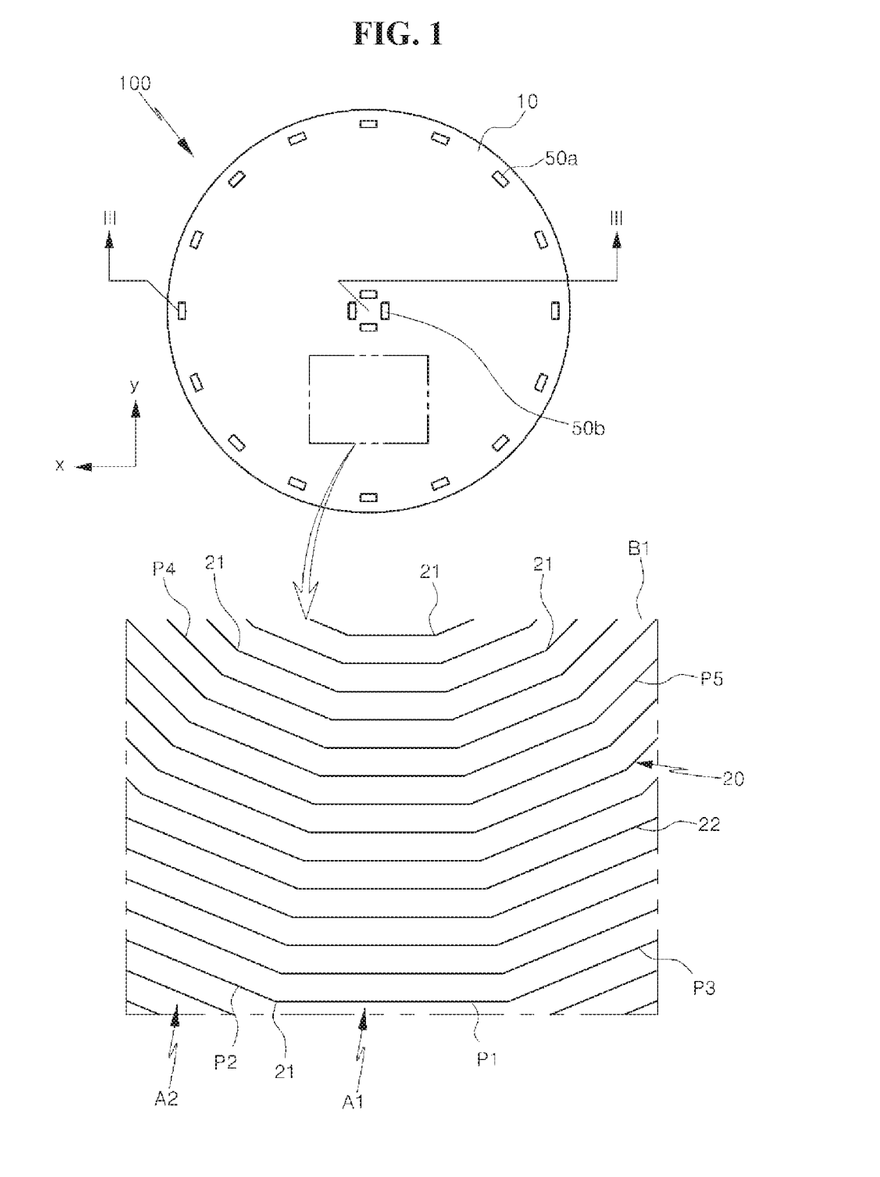
FIG. 1 is a plan view of a lighting apparatus according to one embodiment of the present invention.

FIG. 1 is a plan view of a lighting apparatus according to one embodiment of the present invention.

Referring to FIG. 1, a lighting apparatus 100 according to one embodiment of the present invention includes a light guide portion 10, a three-dimensional effect formation portion 20, a first light source 50a, and a second light source 50b.

The light guide portion 10 is provided in the form of a plate or film which includes a first surface (see reference numeral 11 of FIG. 3) and a second surface (see reference numeral 12 of FIG. 12) which is a surface opposite to the first surface and roughly parallel therewith. In the present embodiment, the second surface may correspond to a pattern arrangement surface in which a pattern 22 of the three-dimensional effect formation portion 20 is provided.

The light guide portion 10 includes a transparent material, for example, a glass, a resin, etc. Light transmittance of the transparent material may be about 50% or more, and may preferably be about 80% or more. When a resin is used, the light guide portion 10 may be provided as an ultraviolet (UV) curing resin which includes an oligomer. The oligomer includes any one material selected from a urethane acrylate, an epoxy acrylate, a polyester acrylate, and an acrylic acrylate.

The three-dimensional effect formation portion 20 includes the pattern 22 as shown in the enlarged view of a particular area B1. The pattern 22 may have a striped shape which includes a convex portion, in which a length direction thereof in a shape of a knoll or a wall extends in a first direction, and a concave portion, in which a length direction thereof in a shape of a trench or a valley extends in the first direction, wherein the convex portion and concave portion are sequentially arranged in a second direction which crosses the first direction. In the present embodiment, the pattern 22 is provided with convex and concave shapes of straight line stripes in which a plurality of pattern units roughly extend in parallel, but is not limited thereto and may be provided with convex and concave shapes of curved stripes.

In addition, in the present embodiment, the pattern 22 includes patterns P1, P2, P3, P4, and P5 provided having different pattern arrangement directions in different pattern areas A1, A2, etc. When pattern units at each pattern area integrally extend, a bent pattern portion 21 may be formed between pattern units of pattern areas adjacent to each other.

The pattern 22 includes an inclined surface (see reference numeral 221 of FIG. 3) inclined with respect to the second surface or the pattern arrangement surface parallel with the second surface. The pattern 22 guides the light which reflects and moves inside the light guide portion 10 to a direction facing the first surface (see z direction in FIG. 3) or a direction facing the second surface (see −z direction in FIG. 3) by refraction and reflection in the inclined surface. In addition, the pattern 22 generates a first linear light which moves in a pattern arrangement direction perpendicular to a pattern extension direction from a first incident light which moves via the first surface 11 of the light guide portion 10 and between the pattern arrangement surfaces. The first linear light has a predetermined width of light in the optical path depending on a pattern designed and has a perceivable depth in a thickness direction of the light guide portion 10.

In the present embodiment, with respect to the light guide portion 10 having a circular shape on a plane, the pattern 22 includes a polygonal outermost pattern unit which is inscribed in the second surface of the light guide portion 10 or in an inside circular plan corresponding to the second surface, and a plurality of pattern units in a concentrically circular shape arranged to be evenly spaced from the outermost pattern unit toward the center. Accordingly, the pattern 22 implements a plurality of first linear lights which are radially irradiated from the center of the light guide portion 10 toward edges, or a plurality of first linear lights which are radially irradiated from the edges of the light guide portion 10 toward the center.

In the present embodiment, a width, length and optical path of the first linear light may be the same or different depending on design of the patterns P1, P2, P3, P4, and P5 at each pattern area. In addition, the pattern 22 is provided by a separate pattern layer (see reference numeral 20a of FIG. 3) disposed on the second surface of the light guide portion 10 but is not limited thereto, and may be implemented by directly processing the second surface of the light guide portion 10 to make a pattern in convex and concave shapes The first light source 50a is disposed to be positioned at the edges of the light guide portion 10. The first light source 50a may be supported by a separate support portion or a printed circuit board (PCB), and may be coupled to a stacked structure of the light guide portion 10 and the three-dimensional effect formation portion 20 and buried by the light guide portion 10 depending on an implementation.

The second light source 50b is disposed to be positioned at a central portion of the light guide portion 10. Similarly to the first light source 50a, the second light source 50b may be supported by a support portion or a PCB (see reference numeral 40 of FIG. 3) or buried by the light guide portion 10. The PCB may be coupled to one surface of the stacked structure to face the light guide portion 10 interposing the three-dimensional effect formation portion 20.

Figure 2:
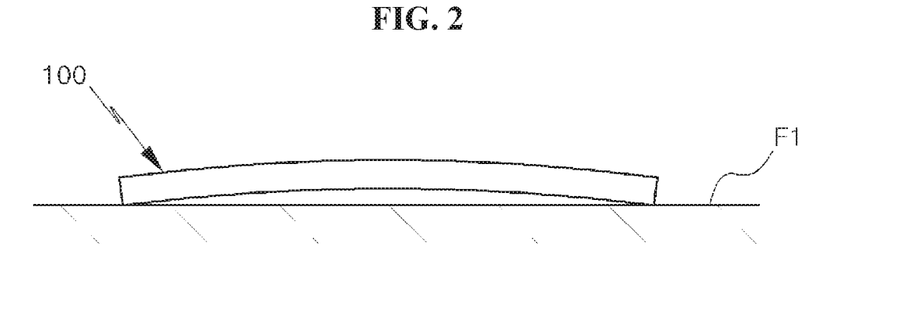
FIG. 2 is a schematic front view of the lighting apparatus of FIG. 1.

FIG. 2 is a schematic front view of the lighting apparatus of FIG. 1.

Referring to FIG. 2, the lighting apparatus 100 according to the present embodiment may be bent to have a predetermined curvature or have a flexibility to be bent as needed by limiting a thickness of the light guide portion and providing the PCB connected to the first light source and the second light source as a flexible PCB.

For example, the lighting apparatus 100 may have a curvature in a shape in which a central portion of the disk shape structure is spaced a certain amount of distance from a surface F1 and an edge of the disk shape structure is in contact with the surface F1. Of course, the lighting apparatus 100 is not limited to the structure having a fixed curvature, but may be provided with flexibility to be attached, having a corresponding curvature, to one surface such as a support portion, a housing, or an outer lens for a vehicle lamp, which has a predetermined curvature.

Figure 3:
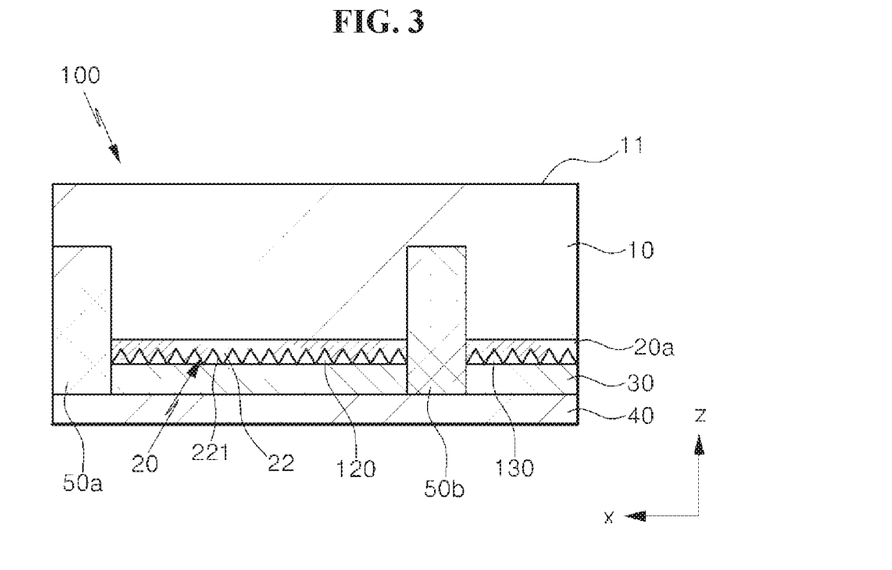
FIG. 3 is a partially enlarged schematic cross-sectional view of the lighting apparatus of FIG. 1.

FIG. 3 is a partially enlarged schematic cross-sectional view of the lighting apparatus of FIG. 1. FIG. 3 corresponds to a cross-section of the lighting apparatus of FIG. 1 taken along line III-III.

Referring to FIG. 3, the lighting apparatus 100 according to the present embodiment includes the light guide portion 10, the three-dimensional effect formation portion 20, the first light source 50a, and the second light source 50b. In addition, the lighting apparatus 100 may further include a reflective layer 30.

The three-dimensional effect formation portion 20 is provided by disposing the pattern layer 20a having the pattern 22 at one surface in the second surface of the light guide portion 10. A thermoplastic polymer, a photopolymer, or the like may be used as a material of the pattern layer 20a. The pattern 22 is provided at one surface of the pattern layer 20a, but is not limited thereto.

In the present embodiment, the pattern 22 is disposed to face the reflective layer 40. In the case, when the pattern layer 20a is coated with a resin to form the light guide portion 10, the pattern 22 covered by the resin is prevented from losing its function. That is, the pattern 22 guides incident light moving into the light guide portion 10 to be linear light having a certain amount of light width at a particular optical path by refraction and reflection at an inclined surface of the pattern, and while the refraction and reflection actions may not be feasible at an inclined surface of the pattern 22 when covered with a resin having a similar refractive index, the above-described problem is prevented in the present embodiment by disposing the pattern 22 in the pattern layer 20a to face the reflective layer 30 disposed at the opposite side of the light guide portion 10.

The pattern layer 20a may be fixed on the reflective layer 30 by an adhesive pattern 130. The adhesive pattern 130 is disposed on a periphery of the first light source 50a and the second light source 50b to stabilize a disposition and secure reliability of the pattern layer 20a. By the disposition of the adhesive pattern 130, the pattern layer 20a on the periphery of light sources may be prevented from being easily separated in comparison to other areas due to the first light source 50a and the second light source 50b disposed to pass through the pattern layer 20a.

The reflective layer 30 is disposed between the PCB 40 and the pattern layer 20a. When disposing the pattern layer 20a on the reflective layer 30, the pattern 22 is disposed to face the reflective layer 30 rather than the light guide portion 10.

The reflective layer 30 may be provided on one surface of the PCB 40 in the form of a film. The reflective layer 30 is provided with a material with high reflection efficiency, and reflects light coming in the first surface direction of the light guide portion 10 from the light sources 50a and 50b via the pattern 22 of the three-dimensional effect formation portion 20 back toward a side of the pattern 22. By the action of the reflective layer 30, the lighting apparatus 100 may reduce optical loss and more clearly display linear light having a three-dimensional effect.

A synthetic resin containing a dispersed white pigment may be used as a material of the reflective layer 30 to enhance properties of light reflection and boosting light dispersion. For example, a titanium oxide, an aluminum oxide, a zinc oxide, a carbonate, barium sulfate, calcium carbonate, etc. may be used as the white pigment, and polyethylene terephthalate, polyethylene naphthalate, acrylic, polycarbonate, polystyrene, polyolefin, cellulose acetate, weather resistant vinyl chloride, etc. may be used as a material of a synthetic resin, but is not limited thereto. In still another embodiment, the reflective layer 30 may be implemented as silver (Ag), aluminum (Al), stainless steel (304SS), or the like.

The lighting apparatus 100 according to the present embodiment may include a separating area 120 between the pattern layer 20a and the reflective layer 30. The separating area 120 may be an air layer or a vacuum layer and may be surrounded by the adhesive pattern 130.

When the reflective layer 30, the separating area 120, and the adhesive pattern 130 are utilized, more various light images may be implemented by controlling linear light with different colors implemented in a single module depending on a design pattern or by controlling performance of light diffusion or light concentration for a dark portion around the linear light.

Figure 4:
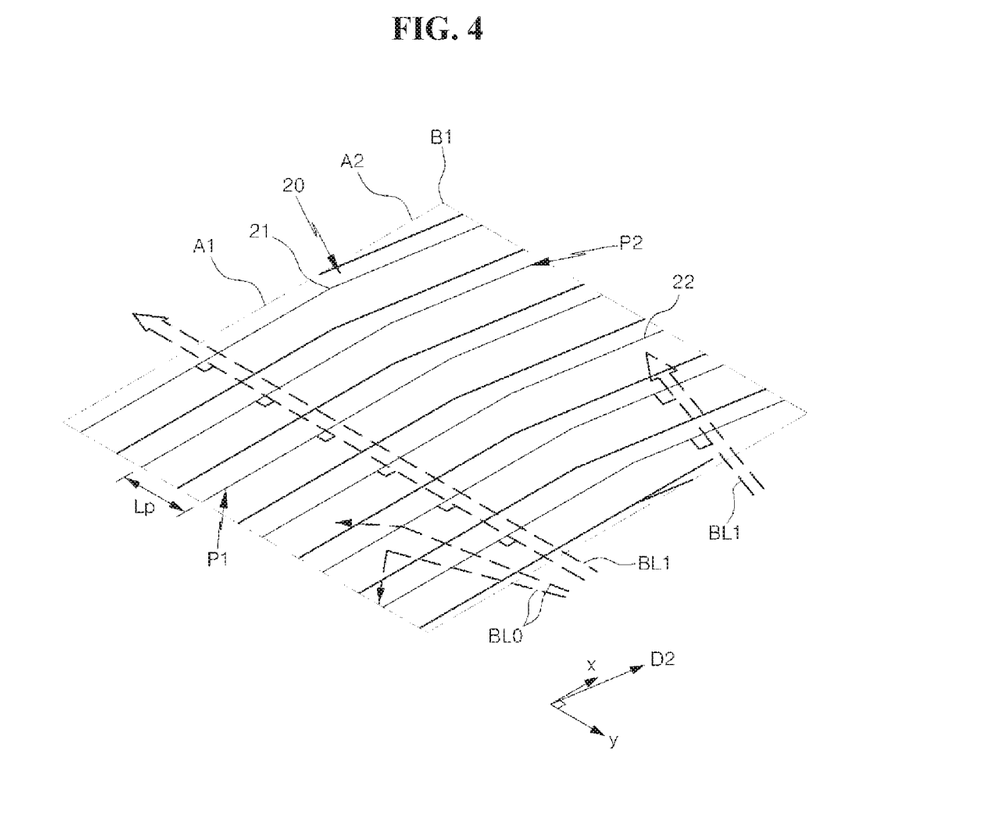
FIGS. 4 and 5 are views for describing an operating principle of a three-dimensional effect formation portion of the lighting apparatus of FIG. 1.

FIG. 4 is a schematic plan view for describing an operating principle of the three-dimensional effect formation portion of the lighting apparatus of FIG. 1.

Referring to FIG. 4, in the lighting apparatus according to the present embodiment, when a first pattern P1 is designed at a first pattern area A1 of the pattern layer 20a to extend in an x direction and sequentially arranged in a first direction (a −y direction) perpendicular to the x direction and a second pattern P2 is designed at a second pattern area A2 of the pattern layer 20a to extend in a D2 direction and sequentially arranged in a second direction perpendicular to the D2 direction, a first incident light of a second light source disposed to face the first pattern area A1 is converted into first linear light BL1 which moves along a first path perpendicular to the extension direction (the x direction) of each pattern of pattern units in the first pattern P1. In addition, first incident light of another second light source disposed to face the second pattern area A2 is converted into another first linear light BL1 which moves through an optical path perpendicular to the extension direction (the D2 direction) of each pattern of pattern units in the second pattern P2.

In the present embodiment, in the pattern 22 of the three-dimensional effect formation portion 20, the pattern extension direction (the x direction or the D2 direction) may be a direction in which a particular straight line on an inclined surface of the pattern units at each pattern area extends or a direction in which a particular tangent of a particular curve on each inclined surface extends. Here, the particular straight line or curve may be parallel with the first surface and the second surface of the light guide portion 10.

In the case of designing pattern, when all of the pattern extension directions of the pattern units are designed to be parallel to each other, the first linear light BL1 formed by patterns has a form of straight line advancing in a direction perpendicular to the pattern extension direction of each pattern unit. This is because the movement of light is concentrated along a least moving path of the pattern according to Fermat's principle stated as 'light that moves between two points in a medium moves along the path that can be traversed in the least time.'

In the present embodiment, some incident light on the pattern 22 of the three-dimensional effect formation portion 20 fails to be converted into the first linear light BL1. That is, the pattern 22 disperses some incident light BL0 (hereinafter referred to as peripheral light) in a direction besides the first path (the optical path of the linear light).

The peripheral light BL0 refers to incident light refracted, reflected, and dispersed to other paths rather than the first path on the pattern 22. Since the peripheral light BL0 is dispersed into a relatively wider range in the light guide portion 10 in comparison to the linear light and is not light heading towards a reference point, the peripheral light BL0 forms a peripheral portion or a dark portion in which luminance is relatively low in comparison to a portion of the first linear light BL1 (hereinafter referred to as bright portion) around the bright portion. The reference point may be a point at which an observer, a camera, or the like is positioned.

In addition, when a pattern of the three-dimensional effect formation portion 20 is designed, an interval Lp between two pattern units adjacent to each other may be in the range of about 10 to 500 μm. The interval Lp may correspond to a pitch or an average interval of patterns. In addition, minimum and maximum intervals for implementing linear light having a three-dimensional effect are considered for the interval Lp, thus implementing the linear light may be limited when the intervals deviate from the minimum and maximum range. That is, when the intervals deviate from the range, it is difficult to implement indirect light sources whose distance sequentially recedes from the reference point due to the inclined surfaces sequentially arranged on the pattern 22, thereby linear light having a three-dimensional effect may not be implemented.

According to the lighting apparatus 100 of the present embodiment, linear light generated by refraction and reflection at the inclined surface of the pattern 22 may be implemented to be controlled to a predetermined light width and a predetermined length by designing the pattern. For example, by designing a pattern having a predetermined width, a particular light width and optical path of the linear light may be implemented to have a uniform light width and extend to an extent as much as a first length, to have a light width gradually decreasing and extend to an extent as much as a second length shorter than the first length, or to have a light width gradually increasing and extend to an extent which is similar to the first length, or shorter or longer than the first length.

Meanwhile, the above-described embodiment is described based on a pattern structure expanding in a striped form with straight lines at least at each pattern area, but it is not limited thereto, and pattern extension directions of the pattern unit of the pattern 22 may be designed to cross at least at a point but not be parallel to each other depending on implementation. In the case, an optical path of the linear light passing the pattern is bent toward a side at which a distance (or an interval) between two pattern units adjacent to each other is small and may become a curved form according to Fermat's principle.

Figure 5:
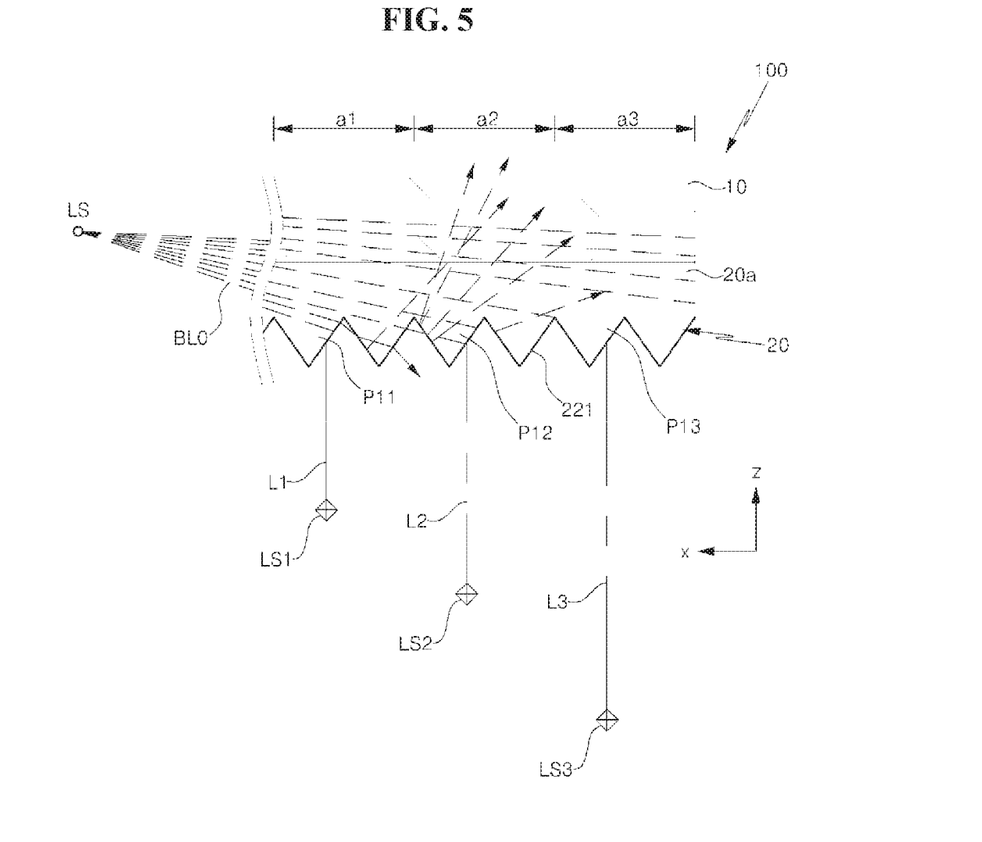

FIG. 5 is a partially enlarged schematic cross-sectional view for describing an operating principle of the three-dimensional effect formation portion of the lighting apparatus of FIG. 1.

Referring to FIG. 5, in the lighting apparatus 100 according to the present embodiment, when light is incident from a particular light source LS on the light guide portion 10, an incident light BL0 which passes through the light guide portion 10 moves by being reflected in the light guide portion 10 at below a critical angle determined by a refractive index of the light guide portion 10 and a refractive index of an external medium (air).

When the incident light BL0 meets the inclined surface 221 of the pattern 22, the incident light BL0 is refracted and reflected by the inclined surface 221 to advance in the first surface direction (the z direction) facing the first surface 11 of the light guide portion 10 or in the second surface direction (the −z direction) facing the second surface, and is radiated to outside the light guide portion 10.

In the case described above, each pattern unit of the pattern 22 works as an indirect light source which refracts or reflects the incident light by the inclined surface and radiates the incident light in the first surface direction or in the second surface direction. Here, the indirect light sources formed by each of the pattern units of the pattern 22 appear to be positioned to gradually recede depending on distances from the light source LS when viewed from a certain reference point outside the lighting apparatus.

For example, when the pattern units are sequentially arranged in the pattern arrangement direction (the −x direction) based on the light source LS and include a first pattern unit P11 at a first area a1, a second pattern unit P12 at a second area a2, and a third pattern unit P13 at a third area a3 from the nearest to the light source along the optical path in the pattern arrangement direction, a second optical path which is a travel distance of incident light reaching the second pattern unit P12 from the light source LS is longer than a first optical path from the light source LS to the first pattern unit P11 and shorter than a third optical path from the light source LS to the third pattern unit P13. That is, a second distance L2 which is an optical path of the light by the second pattern unit P12 from a second indirect light source LS2 toward the reference point is longer than a first distance L1 which is an optical path of the light by the first pattern unit P11 from a first indirect light source LS1 toward the reference point and shorter than a third distance L3 which is an optical path of the light by the third pattern unit P13 from a third indirect light source LS3 toward the reference point.

As described above, when viewed from a certain reference point, each pattern unit of the pattern 22 works as an indirect light source which is sequentially arranged on a particular optical path, positioned to gradually recede, and gradually decreases in luminance, and thereby linear light having a three-dimensional effect on an optical path is implemented by a structure of the pattern 22.

The linear light having a three-dimensional effect described above refers to a light image having a perceivable depth in which linear light guided and restricted to a particular light width in an optical path preset by a pattern gradually moves into the light guide portion 10 from the first surface of the light guide portion 10 toward the second surface (or the pattern arrangement surface) thereof (or the other way around) when viewed from the first surface direction or the second surface direction.

Meanwhile, in the pattern units of the first pattern unit to the third pattern units P11, P12, and P13 described above, the second pattern unit P12 may be a pattern unit positioned immediately after the first pattern unit P11 on the second surface of the light guide portion 10 or the pattern unit interposed between the first pattern unit P11 and a predetermined number of other pattern units when viewed from the light source LS. Similarly, the third pattern unit P13 may be a pattern unit positioned immediately after the second pattern unit P12 or the pattern unit interposed between the second pattern unit P12 and a predetermined number of other pattern units when viewed from the light source.

Figure 6:
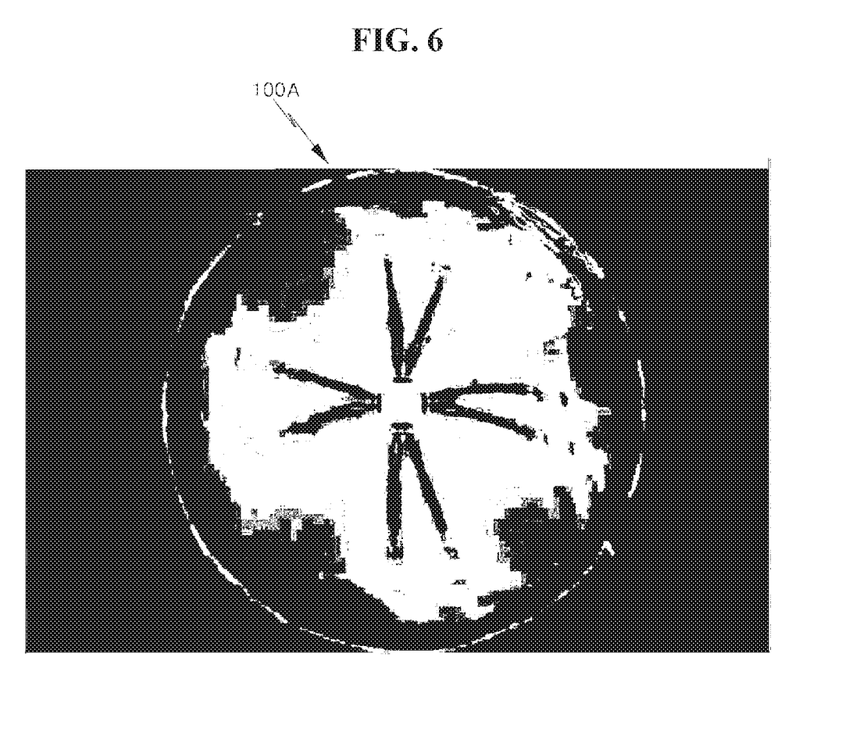
FIG. 6 is a view of a first operating state of the lighting apparatus of FIG. 1.
Figure 7:
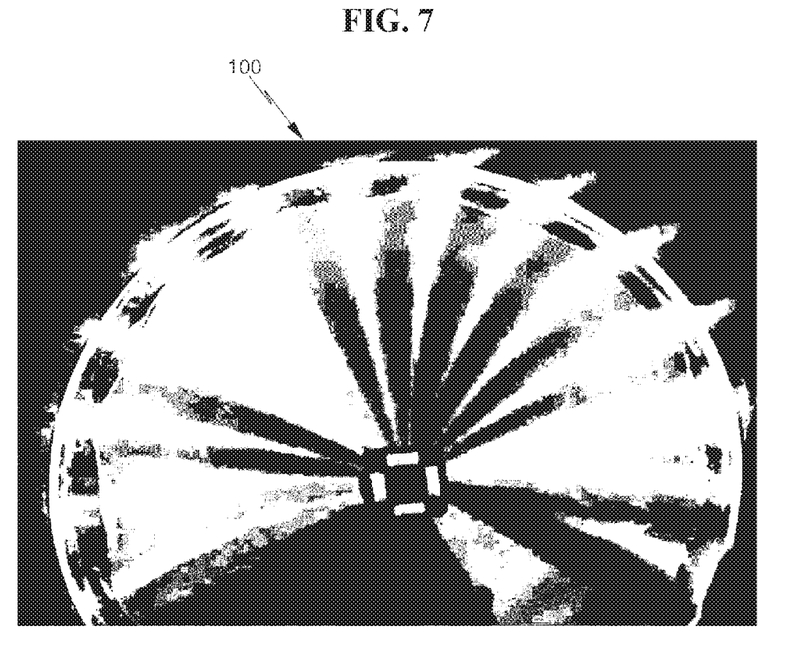
FIG. 7 is a view of a second operating state of the lighting apparatus of FIG. 1.

FIG. 6 is a view of a first operating state of the lighting apparatus of FIG. 1. FIG. 7 is a view of a second operating state of the lighting apparatus of FIG. 1.

In the circular shaped lighting apparatus of the present embodiment, a plurality of first light sources formed of a white light emitting diode (LED) package facing a central portion are disposed to be evenly spaced at an outer portion of the apparatus, and four second light sources formed of red LED packages facing the outer portion are disposed to have backs thereof facing one another at the central portion of the apparatus.

Referring to FIG. 6, light from each of the red LED packages is converted into linear light and displayed due to patterns of each pattern area. In the present embodiment, since two pattern areas are disposed facing each other at a light emitting surface of one red LED package, each red LED package is illustrated as a form of providing two linear lights toward two pattern areas.

Referring to FIG. 7, light from each of the white LED package is converted into and seen as linear light in the form in which light width decreases while moving from the outer portion toward the central portion and moves from a thickness direction of the apparatus toward a lower portion of the central portion due to patterns of each pattern area.

According to the present embodiment described above, light images with different colors and shapes may be implemented in a single lighting module by mixing LED packages emitting light with different colors, and thereby not only a size of a light source and a material cost be reduced but also a benefit in terms of design can be achieved without installing two or more separate lighting modules.

Meanwhile, two kinds of LED packages having colors of white and red are used in the present embodiment described above but the embodiment is not limited thereto, and may be implemented by substituting or adding LED packages with other colors such as amber or the like.

Figure 8:
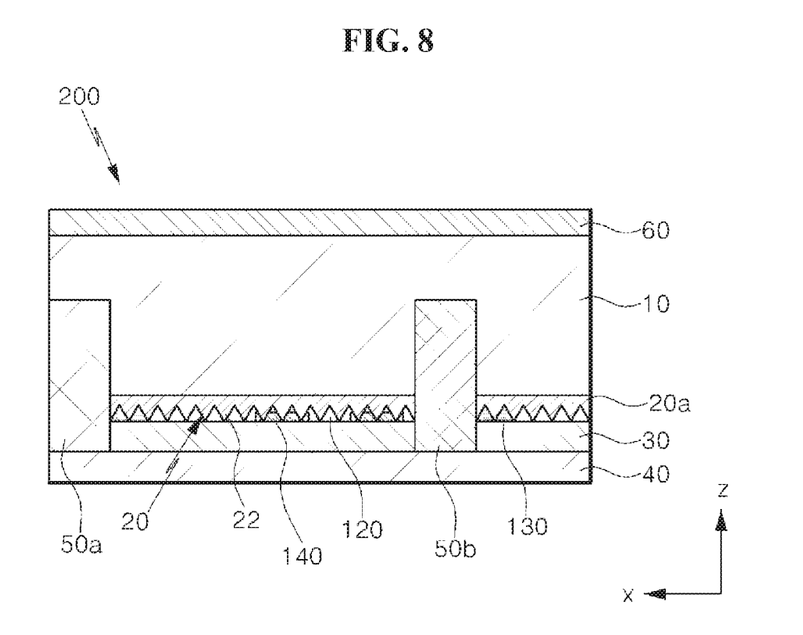
FIG. 8 is a cross-sectional view of a lighting apparatus according to another embodiment of the present invention.
Figure 9:
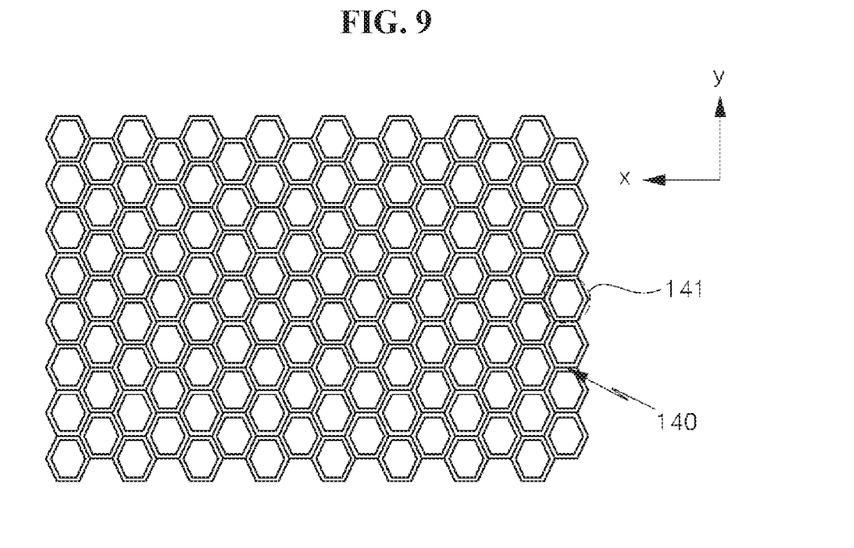
FIG. 9 is an example view of a reflective pattern of the lighting apparatus of FIG. 8.

FIG. 8 is a cross-sectional view of a lighting apparatus according to another embodiment of the present invention, and FIG. 9 is an example view of a reflective pattern of the lighting apparatus of FIG. 8.

Referring to FIG. 8, a lighting apparatus 200 according to the present embodiment includes a light guide portion 10, a three-dimensional effect formation portion 20, a first light source 50a, and a second light source 50b. In addition, the lighting apparatus 200 may further include a reflective pattern 140 and a protective layer 60 on a reflective layer 30.

The light guide portion 10, the three-dimensional effect formation portion 20, the reflective layer 30, a PCB 40, the first light source 50a, the second light source 50b, a separating area 120, and an adhesive pattern 130 which are in the lighting apparatus 200 are substantially the same as the corresponding components of the lighting apparatus 100 described above with reference to FIG. 3, thus detailed description thereof will be omitted.

The reflective pattern 140 is provided on the reflective layer 30 to control reflection efficiency and a reflective area of the reflective layer 30. The reflective pattern 140 may be implemented by applying a material containing a reflective substance onto one surface of the reflective layer 30 facing a pattern layer 20a using a printing process.

The reflective pattern 140 may be provided in a form in which a pattern unit 141 having a hexagonally shaped cross-section is arranged in a honeycomb pattern as illustrated in FIG. 9. The reflective pattern 140 may use the same material as the material of the reflective layer 30. For example, $TiO_2$, $CaCO_3$, $BaSO_4$, $Al_2O_3$, silicon, poly styrene (PS), or the like may be used as the material of the reflective pattern 140.

The protective layer 60 is disposed on the light guide portion 10 to protect the light guide portion 10. The protective layer 60 is properly used for protecting the flexible light guide portion 10 when the light guide portion 10 is a resin layer. The protective layer 60 is formed of a film material having transparency and durability, and, for example, polyethylene terephthalate (PET) or the like may be used as the film material.

According to the present embodiment, a flexible lighting apparatus may be implemented, and more various light images may be implemented when implementing the linear light having a three-dimensional effect in the flexible lighting apparatus using patterns 22 and different light sources by controlling areas and performance of light diffusion and light scattering using the separating area 120, the adhesive pattern 130, the reflective pattern 140, or a combination thereof.

Meanwhile, the above embodiment is described based on the reflective pattern 140 being implemented as a pattern separate from the adhesive pattern 130, but it is not limited thereto, and the reflective pattern 140 and the adhesive pattern 130 may also be integrally formed. For example, the adhesive pattern 130 may contain a reflective substance, be formed as a predetermined pattern (a honeycomb shape or the like), and may be used to limit reflectivity and a reflective area of the reflective layer 30. In addition, when the adhesive pattern 130 is not formed and the pattern layer 20a is supported and fixed on the reflective layer 30 by being attached or bonded to a resin layer, the adhesive pattern 130 may not be formed and only the reflective pattern 140 may be formed on the reflective layer 30 depending on an implementation.

Figure 10:
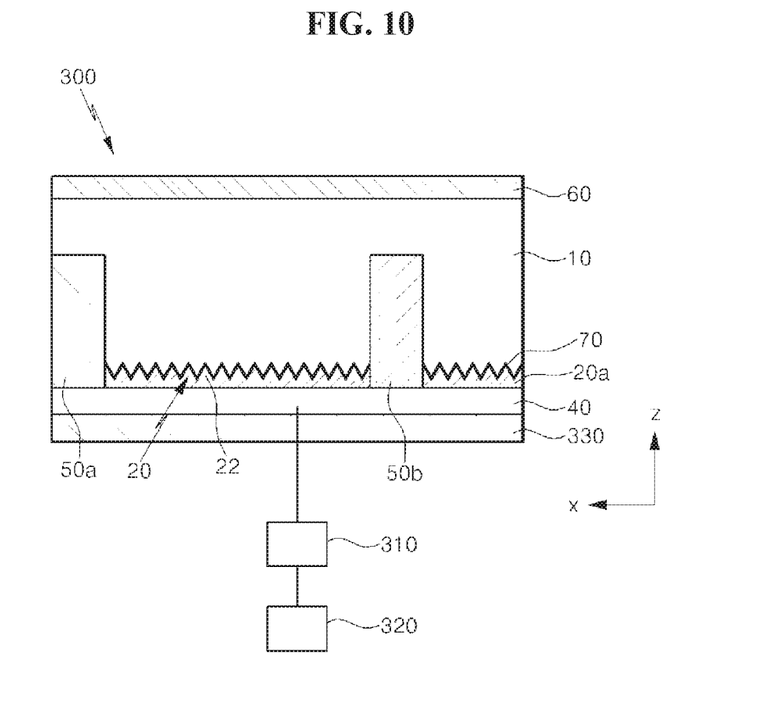
FIG. 10 is a schematic cross-sectional view of a lighting apparatus according to still another embodiment of the present invention.

FIG. 10 is a schematic cross-sectional view of the lighting apparatus according to still another embodiment of the present invention.

Referring to FIG. 10, a lighting apparatus 300 according to the present embodiment includes a light guide portion 10, a three-dimensional effect formation portion 20, a first light source 50a, and a second light source 50b. The lighting apparatus 300 may further include a separating film 70 between a pattern layer 20a and the light guide portion 10. In addition, the lighting apparatus 300 may include a control unit 310 and a power supply unit 320 which are connected to the first light source 50a and the second light source 50b via a PCB 40, and may include a support portion 330 which supports the light guide portion 10, the three-dimensional effect formation portion 20, and the PCB 40.

Although the three-dimensional effect formation portion 20 of the lighting apparatus 300 is provided by the pattern layer 20a between the PCB 40 and the light guide portion 10, the present embodiment has a major feature of a pattern 22 disposed at one surface of the pattern layer 20a and facing the light guide portion 10 rather than facing the PCB 40.

The light guide portion 10, the three-dimensional effect formation portion 20, the PCB 40, the first light source 50a, and the second light source 50b, which are in the lighting apparatus 300, are substantially the same as the corresponding components of the lighting apparatus described above with reference to FIG. 3 or FIG. 8, thus detailed description thereof will be omitted.

The separating film 70 separates the pattern 22 provided at one surface of the pattern layer 20a and the light guide portion 10 which covers the pattern 22 to clearly define a boundary therebetween. That is, when the pattern layer 20a is disposed on a reflective layer 30 and the light guide portion 10 is disposed on the pattern layer 20a, the separating film 70 prevents a boundary of the pattern 22 for light refraction and light reflection from becoming unclear because the pattern 22 of the pattern layer 20a is buried by the light guide portion 10. Such a phenomenon occurs when a refractive index difference between the pattern layer 20a and the light guide portion 10 is small.

That is, when the pattern 22 of the three-dimensional effect formation portion 20 is buried by the resin layer, an inclined surface of the pattern 22 may not adequately perform functions of reflection and refraction due to the resin layer which forms the light guide portion 10. Particularly, when a refractive index of the light guide portion 10 and a refractive index of the pattern layer 20a are similar to each other, for example, when the refractive index difference is 0.2 or less, the inclined surface of the pattern 22 positioned therebetween may not adequately perform the action of refraction and reflection for incident light.

In the case of the above description, linear light having a three-dimensional effect may be difficult to be implemented because incident light of the light sources 50a and 50b may not be guided toward an upper portion of the light guide portion 10 by refraction and reflection at the pattern 22 of the three-dimensional effect formation portion 20. Therefore, in the lighting apparatus 300 according to the present embodiment, the separating film 70 is disposed between the pattern 22 and the light guide portion 10 to make the boundary between the light guide portion 10 and the pattern 22 clear, and thereby enables the functions of reflection and refraction of the incident light at the pattern 22 to be smoothly performed.

According to above description, the pattern 22 of the three-dimensional effect formation portion 20 has a form which is disposed amid the light guide portion 10. That is, when the pattern layer 20a is provided with the same material as the light guide portion 10 or provided with a light guide material (a particular resin) in which the refractive index difference therebetween is 0.2 or less, the pattern 22 is substantially buried in the light guide resin layer provided by the pattern layer 20a and the light guide portion 10 but may maintain its function by the separating film 70 on the pattern.

The separating film 70 may be a metallic coating layer disposed between the light guide portion 10 and the pattern layer 20a to maintain the refractive index difference therebetween as a certain value or more. For example, the separating film may be provided with the same or similar material as the material of the reflective layer (see reference numeral 30 of FIG. 3).

The control unit 310 is connected to the first light source 50a and the second light source 50a via the PCB 40 and controls operation of the first light source 50a and the second light source 50a. The control unit 310 selectively controls operation of the first light source 50a and the second light source 50a to function so that light with a color preset by an LED package of each power supply radiates via the lighting apparatus.

The control unit 310 may be mounted on the PCB 40 with a driving circuit or driving device mounted on the PCB 40 to control the first light source 50a and the second light source 50a, but is not limited thereto, and may be implemented as at least a functional part of a control unit of an application using the lighting apparatus 300 or a composition part which performs the corresponding function thereto. When the lighting apparatus is used as a vehicle lamp (a rear combination lamp, a rear light, etc.), the control unit of the application may be one among a plurality of vehicle control units installed in a vehicle.

The power supply unit 320 is connected to the first light source 50a and the second light source 50a via the PCB 40 or the control unit 310, and supplies electric power to the first light source 50a and the second light source 50a. According to a control from the control unit 310, the power supply unit 320 may be operated to supply power to any one of the first light source 50a and the second light source 50a and stop supplying power to the other.

The power supply unit 320 is mounted in the lighting apparatus 300 and may be implemented with battery power connected to the PCB 40 or control unit 310, but is not limited thereto. For example, the power supply unit 320 may be a wiring or connector which connects the PCB 40 or the control unit 310 to commercial electricity. In the case, the power supply unit 320 may include a power converter (not shown) which converts the commercial electricity to driving power.

The support portion 330 may be a frame, a case, or a housing which supports components of the lighting apparatus 300. Depending on a lighting application which uses the lighting apparatus 300, the support portion 330 may be provided with various structures, forms, or materials. For example, the support portion 330 may be implemented as a part of lighting installation targets such as a building, a facility, furniture, etc. In addition, when the lighting apparatus 300 is used as a vehicle lamp, the support portion 330 may be an outer lens of the vehicle lamp.

Figure 11:
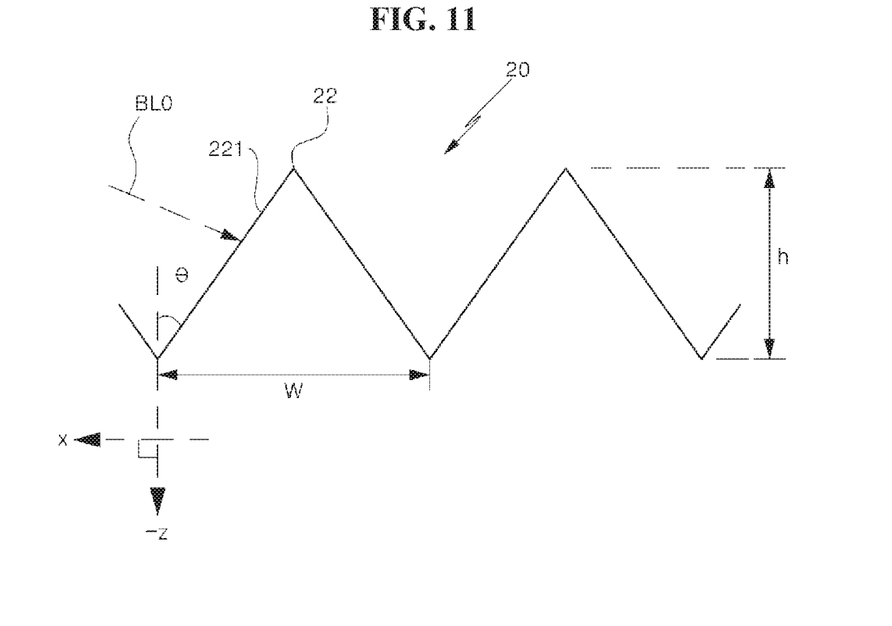
FIGS. 11 to 13 are views for describing a pattern structure applicable to the three-dimensional effect formation portion of the lighting apparatus of FIG. 1.
Figure 12:
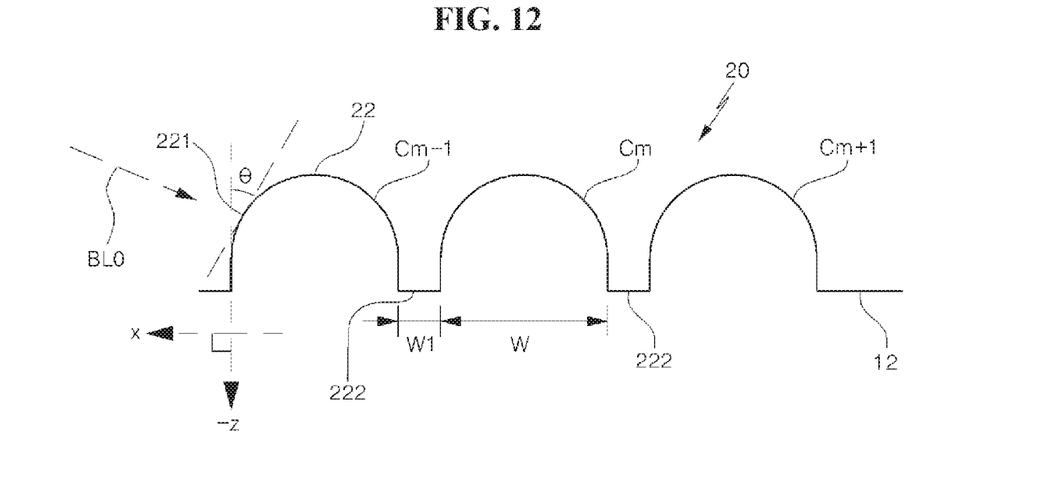
Figure 13:
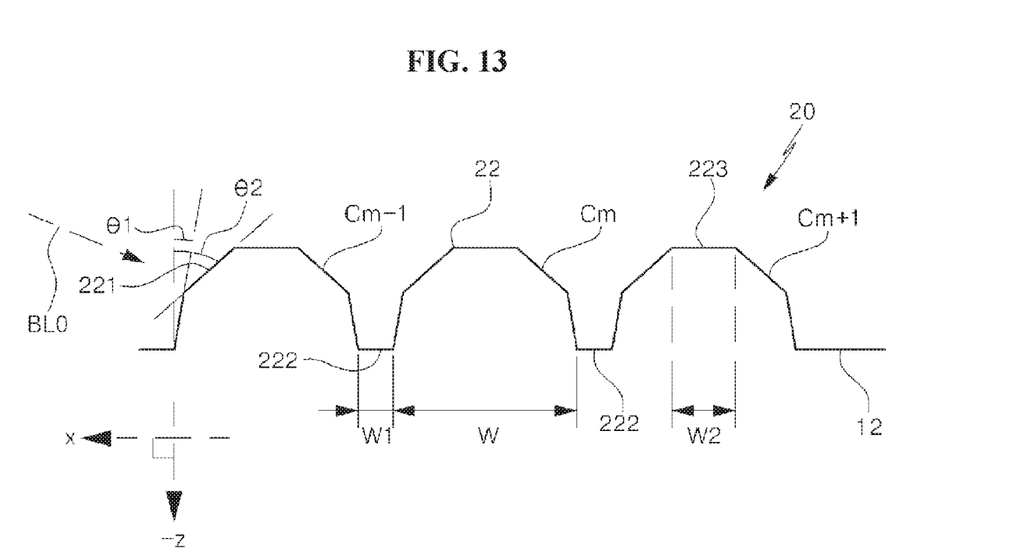

FIGS. 11 to 13 are views for describing a pattern structure applicable to the three-dimensional effect formation portion of the lighting apparatus of FIG. 1.

Referring to FIG. 11, the pattern 22 of the three-dimensional effect formation portion 20 has a pattern structure in a triangular cross-section shape. When the pattern 22 has a triangular cross-section structure, the inclined surface 221 formed on the triangular cross-section structure has a predetermined inclination angle with respect to an x direction. In other words, the inclined surface 221 may be designed to be inclined by a predetermined inclination angle $\theta$ with respect to a direction (a z direction) perpendicular to a first surface or the second surface 12 of the light guide portion.

The inclination angle $\theta$ of the inclined surface 221 may be about 5° or more and about 85° or less. The inclination angle $\theta$ may be limited considering a refractive index of the light guide portion but may basically be in the range of about 5° to 85° when minimum and maximum angles in which reflection and refraction are available at the inclined surface 221 are considered.

For example, when a refractive index of the light guide portion falls within the range of about 1.30 to about 1.80, the inclination angle of the inclined surface 221 may be in the range of greater than about 33.7° and smaller than 50.3° depending on a reference direction (the z direction or the x direction) or may be in the range of greater than about 49.7° and smaller than 56.30.

In addition, the light guide portion or the three-dimensional effect formation portion 20 may be provided using a material with a high refractive index depending on an implementation. For example, in the case of manufacturing a high-luminous-intensity LED, when light with an particular incident angle passes a die and penetrates a capsule material, a total internal reflection occurs due to a difference of n (a refractive index) value between the die (n=2.50~3.50) and an ordinary polymer capsule material (n=1.40~1.60) resulting in degradation of a light extraction efficiency, and thus a polymer with a high refractive index is used to adequately resolve the problem. That is, in the present embodiment, when the pattern 22 is provided using a polymer with a high refractive index used in manufacturing a high-luminous-intensity LED, the inclination angle of the inclined surface of the pattern 22 may be in the range of greater than about 23.6° and smaller than 56.3° depending on the refractive index of the pattern.

The inclination angle according to the above-described refractive index conforms to Snell's law and may be represented as Equation 1 below.

$$\frac{\sin\theta_1}{\sin\theta_2} = \frac{n_2}{n_1} \quad \text{[Equation 1]}$$

In Equation 1, $\sin\theta_1$ represents an incident angle or a refraction angle of light in a first medium having a first refractive index ($n_1$), and $\sin\theta_2$ represents a refraction angle or an incident angle of light in a second refractive index ($n_2$).

As described above, in the lighting apparatus of the present embodiment, an inclined surface of the pattern which forms the three-dimensional effect formation portion may be provided with an inclination angle which may adequately reflect or refract incident light in the range of about 5° to about 85°.

In addition, in the present embodiment, for convenience and the like of a manufacturing process of the pattern 22, a width W between adjacent unit patterns versus a height H may be limited by a predetermined ratio. The width W may be a certain interval between two adjacent unit patterns, that is, a pitch. For example, when a pattern of a lighting apparatus is designed to emphasize a perceivable depth of linear light, the width W is provided to be the same as the height H or smaller. In addition, when a pattern is designed to express a relatively long image of linear light, the width W is provided to be greater than the height H.

The width W of the above-described pattern 22 may be in the range of about 10 μm to about 500 μm. The width W may be an average interval between two unit patterns adjacent to each other in the x direction, and may be adjusted depending on a pattern design arrangement structure or a desired form of light image.

Meanwhile, when the pattern 22 has a lenticular shape, a ratio (h/w) of the width W (or diameter) versus a height of the pattern 22 may be designed to be about ½ or less or an inclination angle θ of the inclined surface thereof may be designed to be about 60° or less to implement linear light.

In addition, when the ratio (h/w) of the width to the height of the pattern 22 is designed to be less than 1, a depth of the concave portion is lower than when the ratio (h/w) of the width to the height of the pattern 22 is 1 or more, and thereby manufacturing the pattern is easier.

According to the present embodiment, by designing an optical member using the width W and the height H of the pattern 22 as factors for controlling properties, various light images desired to be implement by linear light having a three-dimensional effect may be efficiently and easily controlled.

Referring to FIG. 12, in the lighting apparatus of the present embodiment, the pattern 22 of the three-dimensional effect formation portion 20 may be provided in a semi-circular cross-section shape, a semi-ellipse cross-section shape, or a lenticular shape. The pattern 22 is provided with the inclined surface 221 inclined at a predetermined angle in the thickness direction of the light guide portion or at the direction (the z direction) perpendicular to the second surface opposite to the first surface of the light guide portion. The pattern 22 may have a symmetrical shape based on a central line of the pattern in the z direction.

The inclined surface 221 of the pattern 22 may have a structure in which a position on the inclined surface which the incident light BL0 meets changes depending on a position of the incident light BL0 because of the semi-circular cross-section structure. That is, since the inclined surface 221 of the pattern 22 in the present embodiment is a surface that touches an arbitrary point on a circular arc, a tangent touching an arbitrary point on the pattern 22 may be placed at the predetermined inclination angle θ from the direction (the z direction) perpendicular to the second surface 12 of the light guide portion. The inclination angle θ may be greater than 0° and less than 90° depending on a position on the semi-circular cross-section at which the incident light BL0 collides.

In the present embodiment, the pattern 22 of the three-dimensional effect formation portion 20 may further include a separating portion 222 provided between two unit patterns adjacent to each other. For example, when the pattern 22 includes a first unit pattern Cm−1, a second unit pattern Cm, and a third unit pattern Cm+1 (here, m is a natural number of 2 or more), the three-dimensional effect formation portion 20 may include separating portions 222 between the first unit pattern Cm−1 and the second unit pattern Cm and between the second unit pattern Cm and the third unit pattern Cm+1.

The separating portion 222 is a portion in which a concave unit pattern is not formed on the second surface 12 of the light guide portion, and may be a portion of the second surface 12 positioned between adjacent two unit patterns. In addition, the separating portion 222 is a separating interval between two unit patterns adjacent to each other, and may be provided for convenience of a manufacturing process. The separating portion 222 may be omitted depending on a pattern design.

Meanwhile, in the case in which the separating portion 222 is included, a width W1 of the separating portion 222 is designed to be less than the width W of a unit pattern. The width W1 of the separating portion 222 may be about ⅕ of the width W of the pattern 22 or several μm or less. When the width W1 of the separating portion 222 is more than the width W of the pattern 22, smooth linear light may be difficult to be implemented at the pattern 22.

Referring to FIG. 13, in the lighting apparatus of the present embodiment, the pattern 22 of the three-dimensional effect formation portion 20 is provided with a pattern structure in a polygonal cross-section shape. A cross-section of the inclined surface 221 of the pattern 22 has a shape of a broken line graph.

The inclined surface 221 of the pattern 22 may have a plurality of inclination angles θ1 and θ2 depending on the number of segments of the broken line graph from the thickness direction of the light guide portion or from the direction (the z direction) perpendicular to the second surface 12 of the light guide portion. The second inclination angle θ2 may be larger than the first inclination angle θ1. The first inclination angle θ1 and the second inclination angle θ2 may be designed to be within a range of greater than 50 and smaller than 85° depending on the position at which the incident light BL0 meets.

In addition, the three-dimensional effect formation portion 20 of the present embodiment may include the separating portion 222 provided between two unit patterns adjacent to each other. The width W1 of the separating portion 222 is smaller than the width W of the pattern for implementing smooth linear light on the three-dimensional effect formation portion 20. The width W1 of the separating portion 222 may be several μm or less or about ⅕ or less of the width W of the pattern.

In addition, the three-dimensional effect formation portion 20 of the present embodiment may include a severed surface 223 on the pattern 22 which is nearly parallel with the first surface or the second surface. The severed surface 223 is a portion that substantially does not allow light to be radiated to the outside by reflection or refraction of incident light, and because linear light implemented by the pattern 22 may have a severed portion corresponding to the severed surface 223, a width W2 of the severed surface 223 may be adequately designed to be several μm or less for consecutively implementing linear light. Meanwhile, the severed surface 223 may be omitted when implementing consecutive linear light, and it is a matter of course that the severed surface 223 may be used when implementing discontinuous linear light.

Meanwhile, any structure including a shape such as a straight line, a curve, a broken line graph, or a combination thereof which may radiate light advancing inside the light guide portion 10 toward the first surface or the second surface by refracting or reflecting it may be applicable as a cross-section of the inclined surface of each pattern in the above-described embodiment.

In the above-described embodiment, the lighting apparatus is applicable in various field of lighting that require lighting such as a vehicle lamp, a lighting apparatus for domestic use, and a lighting apparatus for industrial use. In the case of being applied as a vehicle lamp, it is applicable to a rear combination lamp, indoor illumination, a rear light, etc. Besides, it may be applicable to all the fields related to lighting which have been developed and commercialized, or may be implemented according to upcoming technological advancement.

Although preferred embodiments have been shown and described to exemplify inventive concept of the present invention, the present invention is not limited to the configurations and operations illustrated and described, and it should be understood by those skilled in the art that various and proper changes and modifications may be made therein without departing from the scope of the technical spirit of the invention. Accordingly, all such proper changes, modifications, and equivalents thereof should be regarded as being included in the scope of the present invention.

The invention claimed is:

1. A lighting apparatus comprising:
a light guide portion including a first surface and a second surface opposite to the first surface, and having a predetermined thickness between the first surface and the second surface;
a three-dimensional effect formation portion disposed in the light guide portion or on a surface thereof and including a pattern;
a first light source disposed in a first area of the pattern and irradiating incident light of a first color toward the pattern; and
a second light source disposed in a second area of the pattern and irradiating incident light of a second color different from the first color toward the pattern,
wherein the first light source is disposed at an edge of the light guide portion and the second light source is disposed at a central portion of the light guide portion,
wherein the pattern comprises a plurality of pattern units disposed between the first light source and the second light source,
wherein each of the plurality of pattern units comprises a polygonal shape and a center of the plurality of pattern units is the same as the center of the light guide portion, and
wherein sizes of the plurality of pattern units increase away from the center of the light guide portion.

2. The lighting apparatus of claim 1, wherein a material of the light guide portion is glass or a resin.

3. The lighting apparatus of claim 2, wherein the inclined surface of the pattern is a mirror-finish surface.

4. The lighting apparatus of claim 1, wherein a width or a pitch of the pattern is in a range of 10 μm to 500 μm.

5. The lighting apparatus of claim 1, wherein a cross-section of the inclined surface of the pattern is provided with a shape of a straight line, a curve, or a broken line.

6. The lighting apparatus of claim 2, wherein the three-dimensional effect formation portion includes a pattern layer having the pattern at one side and disposed on the second surface of the light guide portion.

7. The lighting apparatus of claim 6, further comprising a reflective layer facing the light guide portion.

8. The lighting apparatus of claim 7, further comprising a separating area, a reflective pattern, an adhesive pattern, or a combination thereof between the pattern layer and the reflective layer.

9. The lighting apparatus of claim 2, wherein the three-dimensional effect formation portion includes a pattern layer having the pattern at one surface and disposed on the second surface of the light guide portion so the one surface faces the light guide portion.

10. The lighting apparatus of claim 9, further comprising a separating film between the pattern and the light guide portion.

11. The lighting apparatus of claim 2, further comprising a flexible printed circuit board (PCB) on which the first light source and the second light source are mounted and on which the light guide portion or the three-dimensional effect formation portion is stacked.

12. The lighting apparatus of claim 11, wherein a thickness of the light guide portion is in a range of 100 μm or more and 250 μm or less.

13. The lighting apparatus of claim 12, wherein the first light source and the second light source include a light emitting diode (LED) package buried by the light guide portion.

14. The lighting apparatus of claim 13, furthering comprising an outer lens for a vehicle lamp in which the light guide portion and the three-dimensional effect formation portion are stacked and disposed.

15. The lighting apparatus of claim 14, wherein the first light source and the second light source are connected to a battery for a vehicle and are operated by battery power of the vehicle.

16. The lighting apparatus of claim 1, wherein the pattern includes a first pattern disposed in a first pattern area of the three-dimensional effect formation portion and a second pattern disposed in a second pattern area different from the first pattern area, and is provided with a bent pattern portion in which a pattern extension direction is changed at a boundary portion between the first pattern and the second pattern, wherein a pattern arrangement direction of the second pattern is different from a pattern arrangement direction of the first pattern.

17. The lighting apparatus of claim 16, wherein the first light source and the second light source are disposed on opposite sides of the pattern arrangement direction of the first pattern.

18. The lighting apparatus of claim 17, further comprising a control unit that selectively operates the first light source and the second light source, and the control unit is a vehicle control unit.

19. A lighting apparatus comprising:
a light guide portion including a first surface and a second surface opposite to the first surface, and having a predetermined thickness between the first surface and the second surface;
a three-dimensional effect formation portion disposed in the light guide portion or on a surface thereof and including a pattern;
a first light source disposed in a first area of the pattern and irradiating incident light of a first color toward the pattern; and
a second light source disposed in a second area of the pattern and irradiating incident light of a second color different from the first color toward the pattern,
wherein the pattern includes inclined surfaces sequentially arranged on a pattern arrangement surface parallel with the second surface and having an inclination angle with respect to the pattern arrangement surface, and generates linear light of a first path by guiding the incident light in a first surface direction that faces the first surface or in a second surface direction that faces the second surface by refraction and reflection at the inclined surface,
wherein the three-dimensional effect formation portion includes a pattern layer having the pattern at one surface and disposed on the second surface of the light guide portion so the one surface faces the light guide portion, and
wherein a separating film is disposed between the pattern and the light guide portion.

20. A lighting apparatus comprising:
a light guide portion including a first surface and a second surface opposite to the first surface, and having a predetermined thickness between the first surface and the second surface;
a three-dimensional effect formation portion disposed in the light guide portion or on a surface thereof and including a pattern;
a first light source disposed in a first area of the pattern and irradiating incident light of a first color toward the pattern;
a second light source disposed in a second area of the pattern and irradiating incident light of a second color different from the first color toward the pattern; and
a control unit that selectively operates the first light source and the second light source,
wherein the pattern includes inclined surfaces sequentially arranged on a pattern arrangement surface parallel with the second surface and having an inclination angle with respect to the pattern arrangement surface, and generates linear light of a first path by guiding the incident light in a first surface direction that faces the first surface or in a second surface direction that faces the second surface by refraction and reflection at the inclined surface.

* * * * *